Aug. 4, 1925.  1,548,099
B. REHM
MITER CUTTING MACHINE
Filed July 7, 1923   3 Sheets-Sheet 2
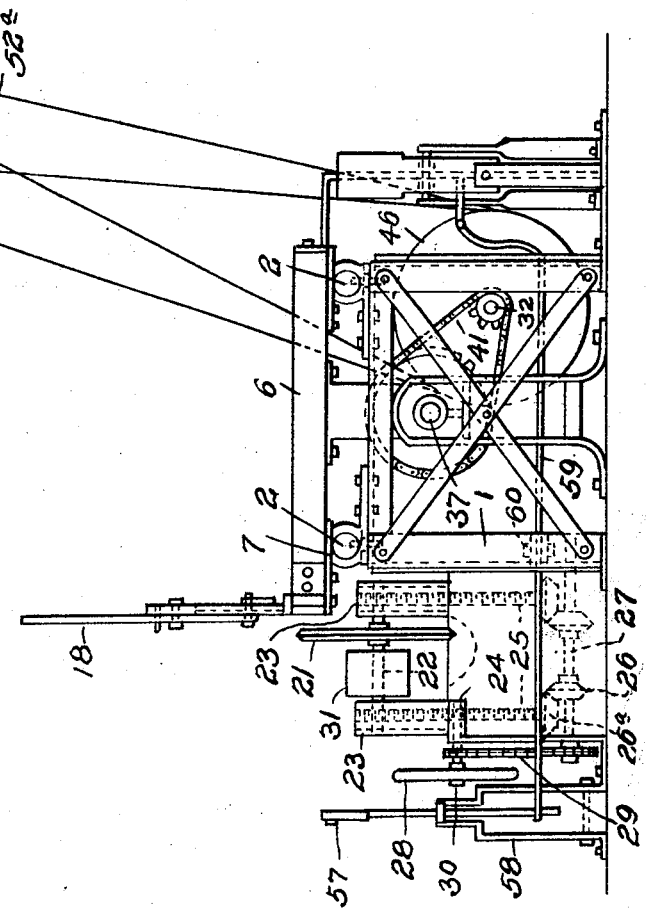
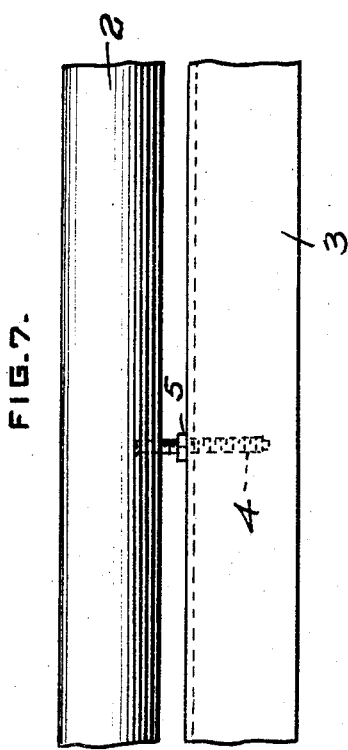
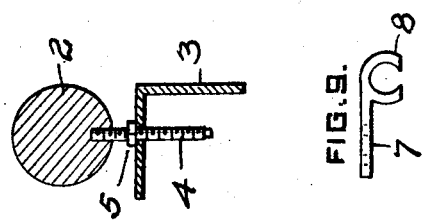
INVENTOR
Benjamin Rehm
By
James C. Bradley
Atty Aug. 4, 1925. 1,548,099
B. REHM
MITER CUTTING MACHINE
Filed July 7, 1923 3 Sheets-Sheet 3
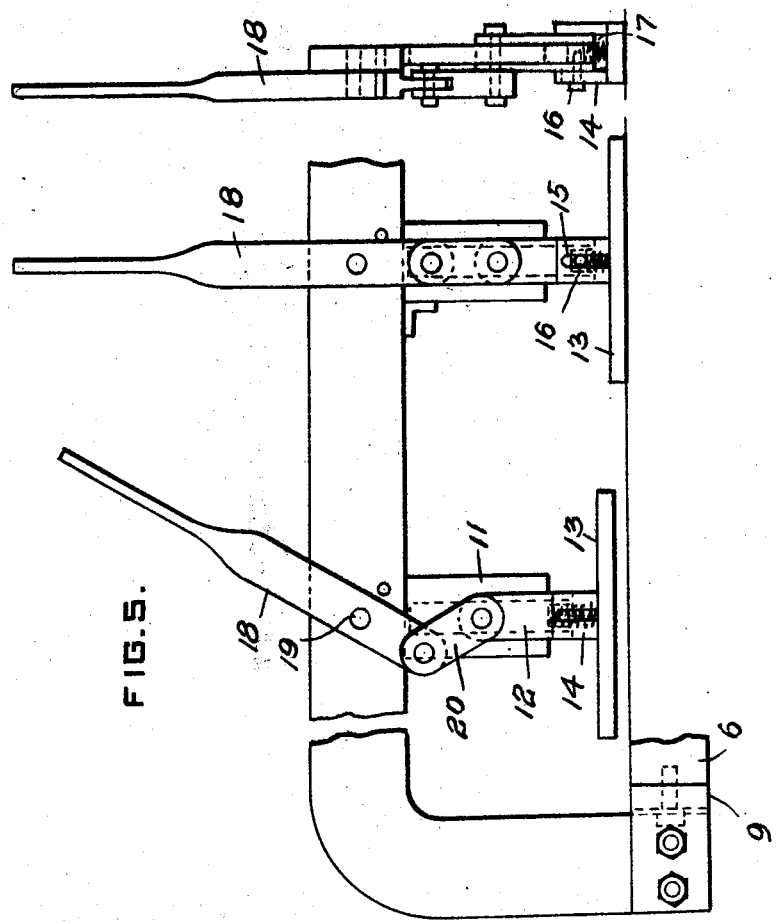
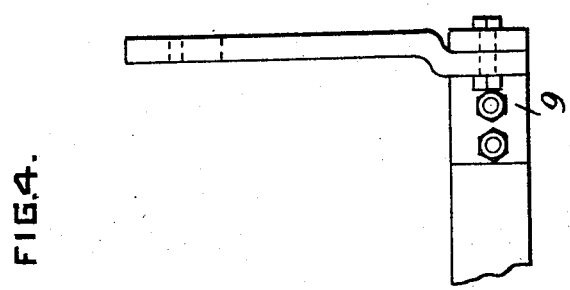

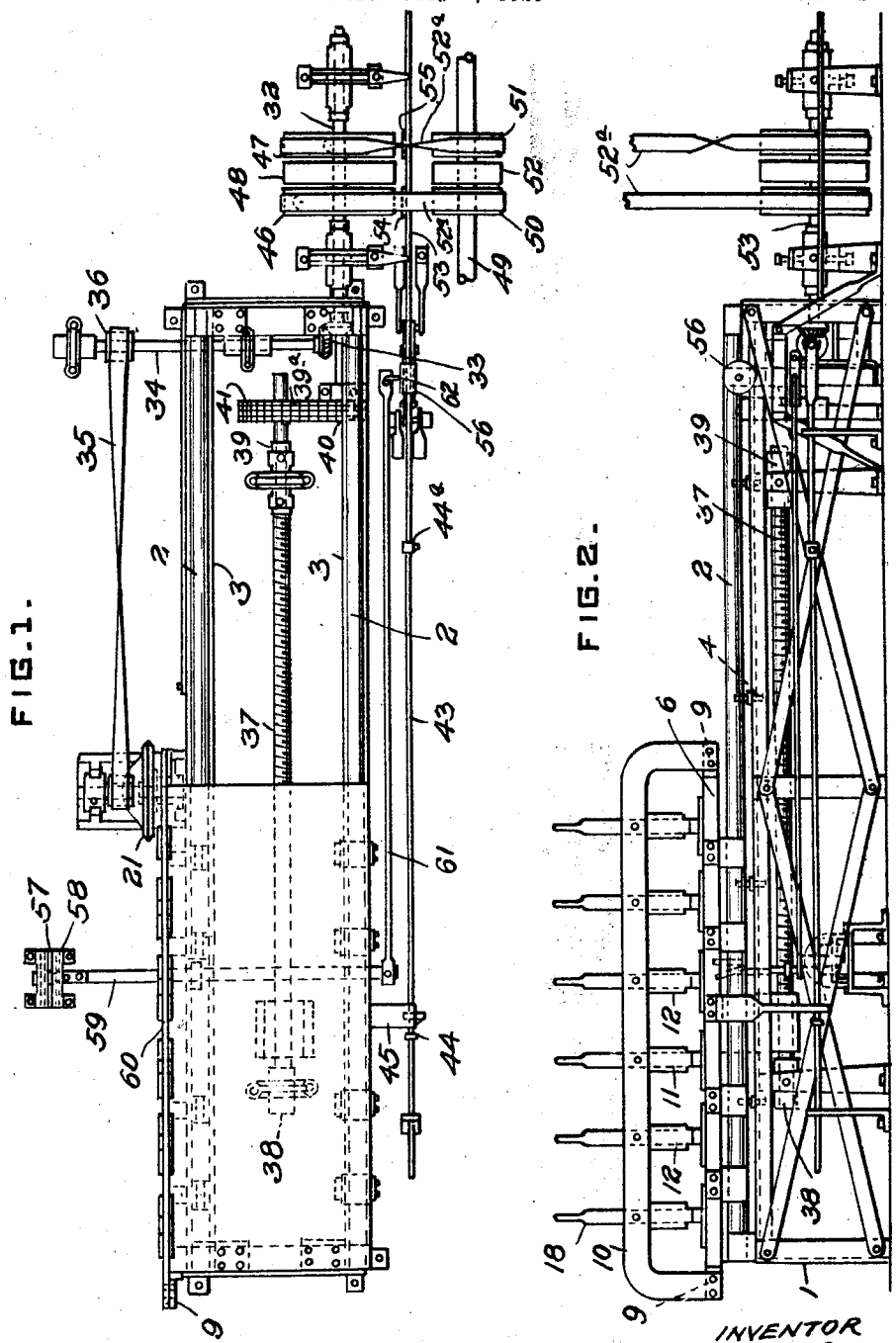

Patented Aug. 4, 1925.

1,548,099

UNITED STATES PATENT OFFICE.

BENJAMIN REHM, OF CRYSTAL CITY, MISSOURI, ASSIGNOR TO PITTSBURGH PLATE GLASS COMPANY, A CORPORATION OF PENNSYLVANIA.

MITER-CUTTING MACHINE.

Application filed July 7, 1923. Serial No. 650,125.

*To all whom it may concern:*

Be it known that I, BENJAMIN REHM, a citizen of the United States, and a resident of Crystal City, in the county of Jefferson and State of Missouri, have made a new and useful invention in Improvements in Miter-Cutting Machines, of which the following is a specification.

The invention relates to an apparatus for cutting miters or grooves in sheet glass, such as is ordinarily done adjacent the edges of the sheet for the purpose of ornamentation. The invention has for its principal object the provision of an improved machine of the character specified, (1) in which a uniform depth in the grooves or miters cut is secured, (2) in which the grooves are cut truly and exactly, (3) which will operate to cut as effectively and rapidly on the back stroke of the machine as on the forward stroke, and which is of simple construction and can be conveniently operated by the workman in charge. One embodiment of the invention is illustrated in the accompanying drawings wherein:

Figure 1 is a plan view of the apparatus. Fig. 2 is a side elevation. Fig. 3 is an end elevation. Figs. 4, 5 and 6 are enlarged detailed views of the device for clamping the glass. Figs. 7 and 8 are enlarged details showing the method of mounting the guides on which the table reciprocates. And Fig. 9 is a detail view of one of the brackets by means of which the table is slidably mounted on the guides.

Referring to the drawings, 1 is the framework of the machine preferably made up of commercial sections and bars suitably bolted or riveted together upon the upper side of which is mounted the pair of guide members 2 preferably in the form of rods of circular cross section. These members carry the reciprocating table and are mounted upon the angle members 3 constituting a portion of the framework of the machine as indicated in Figs. 7 and 8. This mounting consists of a plurality of bolts 4 threaded into the bars and held against rotation with respect to the angles 3 by means of the nut locks 5, which mounting provides for the adjustment of the bars in order to level up the table. The table preferably comprises a wood framework 6 provided on its lower side with the brackets 7 of the construction indicated in Fig. 9, such brackets being bolted to the table and provided with the curved portions 8 adapted to fit around the rods 2. Secured along one side of the table by means of the bracket members 9 is a clamp supporting frame 10, preferably in the form of an inverted U. Mounted upon the lower side of this frame are a plurality of guides 11 in which operate the slide members or plungers 12 shown in detail in Figs. 5 and 6. These plungers carry at their lower ends the spring pressed plates 13 for engaging the glass sheet adjacent the edge to be grooved. The plates are provided with the pairs of upwardly extending bracket members 14 slotted as indicated at 15 to receive the guide bolts 16 which are screwed into the sides of the plungers. The plungers are provided at their lower ends with sockets in which are mounted the springs 17 for pressing the plates 13 yieldingly downward. The plungers are operated by toggle arrangements comprising the hand levers 18 pivoted to the frame 10 as indicated at 19 and the links 20 pivoted to the lower ends of the levers and to the upper ends of the plungers. These clamping members serve to press the sheet of glass which is to be grooved down against the top surface of the table adjacent the edge thereof so that the lower surface of the glass to be grooved lies in a true horizontal plane, even though there should be some slight curvature in the glass plate. This insures that the groove or miter cut by the grinding or cutting wheel shall be of uniform depth from end to end.

The cutting operation is accomplished by means of the wheel 21 (Figs. 1 and 3) of carborundum or other suitable material mounted upon the shaft 22. The shaft is journaled at its ends in a pair of bearings 23 mounted for vertical adjustment in a framework 24 located at the side of the supporting framework of the machine as indicated in Fig. 3. Extending vertically through the bearings 23 are a pair of adjusting screws 25 swiveled in the frame and provided at their lower ends with the bevel gears 26$^a$. These gears are rotated to secure a vertical adjustment of the cutting wheel 21 by means of the pair of gears 26 carried by the shaft 27 which is also mounted in the framework 24. The shaft 27 is rotated from the hand wheel 28 by means of the sprocket chain 29 which passes around sprockets mounted on the shaft 27 and on the shaft 30 which carries the hand wheel. The cutting wheel 21 is in this manner rigidly supported for vertical adjustment so that the exact amount of cutting effect for each reciprocation of the table may be secured.

The shaft 20 which carries the cutting wheel is provided with a pulley 31 and driven from the counter shaft 32 (Fig. 1) through the intermediary of the bevel gears 33, the shaft 34 and the belt 35 which passes around the pulley 36 on the shaft 34 and around the pulley 31.

The table 6 is reciprocated by means of the screw 37 which is swiveled at its ends in the fixed bearings 38 and 39 and is driven from the countershaft 32 by means of the chain 39[a] passing around a sprocket 40 on the end of the countershaft and around the sprocket 41 on the end of the screw shaft. The table has projecting from its lower side a bracket 42 provided with a screw block through which the screw 37 is threaded, so that when the screw is rotated in one direction, the table moves forwardly, and when rotated in the other direction, the table moves backwardly. The reversing of the direction of rotation of the screw automatically in order to give the reciprocating movement of the table is accomplished by means of the shifting rod 43 extending along one side of the table and provided with the adjustable collars 44 and 44[a]. The table has a bracket 45 fitting around the rod and adapted to strike the collars at its extremes of movement and thus secure the reversal of movement. The reversal in direction of rotation of the countershaft 32 is accomplished in the present construction by a conventional belt shifting apparatus but it will be understood that any desired mechanism might be employed for accomplishing this function. The countershaft carries two loose pulleys 46 and 47 and a third pulley 48 which is keyed to the shaft, and on the drive shaft 49 above are corresponding pulleys, the pulleys 50 and 51 being loose, while the pulley 52 is keyed to the shaft. A pair of drive belts 52[a] are employed, one of which is crossed in order to secure the desired reversal of movement. A shifting rod 53 is employed provided with a pair of loops 54 and 55 encircling the belts, the forward end of such rod being secured to the weighted lever 56 which is operated from the rod 43 in a manner well known in the art, the weight being employed to give the required additional shifting force. The belts may also be shifted by hand from the lever 57 supported upon the brackets 58 (Figs. 1 and 3). The lower end of this lever cooperates with a second lever 59 pivoted at 60 and having its end secured to the connecting rod 61 (Fig. 1). This connecting rod is secured at its forward end to the weighted lever 56 by means of the pin 62, so that the belt shifting may be accomplished either by hand or automatically as heretofore set forth.

In operation, a sheet of glass to be grooved or mitered adjacent one of its side edges is placed upon the table with its edge projecting out past the grinding wheel 21 the desired distance and the clamping handles 18 are moved to vertical position to press the plate firmly against the top of the table throughout its length. The collars 44 and 44[a] are then set in such position as to give the table its desired length of reciprocation and the hand lever 57 is operated to shift one of the belts onto the central pulleys 48 and 52. This drives the countershaft 32 and the screw 37 starting the reciprocation of the table. The grinding wheel is now brought into cutting position by means of the hand wheel 24, being raised until it just touches the lower side of the glass. After the table has reached one end of its travel and the bracket 45 engages one of the collars on the shift rod 43, the driving belt on the central pulleys is shifted to a pair of side pulleys, and at the same time the other belt is shifted from the side pulleys to the middle pulleys, thus giving a reversal of movement in the direction of rotation of the countershaft 32 and screw 37. This reversal of movement in the direction of travel of the table also causes a reversal in the direction of rotation of the grinding wheel 21, and I have found that it is important to secure this reversal of movement of the grinding wheel 21 when the travel of the table is reversed as the wheel cuts better when it is rotated in a direction opposite to the direction of travel of the table. By properly arranging the driving connections, the wheel will, therefore, always be driven in this manner so that its cutting edge works against the direction of movement of the glass. After each reversal of movement of the table, the hand wheel 28 is operated to feed the wheel 21 upward a slight amount to increase the depth of the cut, and this operation is continued until the groove is cut to the desired depth.

What I claim is:

1. In combination in a machine for cutting miters in glass sheets, a cutting wheel and a table for the glass sheet mounted for relative vertical movement, with one of such parts mounted for reciprocating movement in a horizontal direction, driving means for giving said part its reciprocating movement, and a plurality of independently operable yielding clamps arranged in series along the side of the table next to the wheel for clamping the glass.

2. In combination in a machine for cutting miters in glass sheets, a cutting wheel and a table for the glass sheet mounted for relative vertical movement, with one of such parts mounted for reciprocating movement in a horizontal direction, driving means for giving said part its reciprocating movement, an inverted U shaped frame mounted along the side edge of the table next to the wheel, and a plurality of independently operable clamps mounted in series on said frame.

3. In combination in a machine for cutting miters in glass sheets, a cutting wheel and a table for the glass sheet mounted for relative vertical movement, with one of such parts mounted for reciprocating movement in a horizontal direction, driving means for giving said part its reciprocating movement, an inverted U shaped frame mounted along the side edge of the table next to the wheel, and a plurality of independently operable clamps mounted in series on said frame, the said clamps each including a spring pressed member for engaging the sheet of glass.

4. In combination in a machine for cutting miters in glass sheets, a cutting wheel and a table for the glass sheet mounted for relative vertical movement, with one of such parts mounted for reciprocating movement in a horizontal direction, driving means for giving said part its reciprocating movement, an inverted U shaped frame mounted along the side edge of the table next to the wheel, a plurality of plungers provided with yielding glass engaging members mounted in series on said frame, and toggle operating means for said plungers.

In testimony whereof, I have hereunto subscribed my name this 3rd day of July, 1923.

BENJAMIN REHM.